US010924535B2

(12) United States Patent
Du et al.

(10) Patent No.: US 10,924,535 B2
(45) Date of Patent: Feb. 16, 2021

(54) RESOURCE LOAD BALANCING CONTROL METHOD AND CLUSTER SCHEDULER

(71) Applicant: HUAWEI TECHNOLOGIES CO., LTD., Guangdong (CN)

(72) Inventors: Shubao Du, Shenzhen (CN); Xibo Jin, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/397,674

(22) Filed: Apr. 29, 2019

(65) Prior Publication Data

US 2019/0253490 A1 Aug. 15, 2019

Related U.S. Application Data

(63) Continuation of application No. PCT/CN2017/092809, filed on Jul. 13, 2017.

(30) Foreign Application Priority Data

Oct. 31, 2016 (CN) .......................... 201610933991.8

(51) Int. Cl.
*H04L 29/08* (2006.01)
*G06F 9/50* (2006.01)

(52) U.S. Cl.
CPC ........ *H04L 67/1008* (2013.01); *G06F 9/5088* (2013.01); *H04L 67/1029* (2013.01)

(58) Field of Classification Search
CPC ............. H04L 67/1008; H04L 67/1029; G06F 9/5088
See application file for complete search history.

(56) References Cited

U.S. PATENT DOCUMENTS

2014/0082202 A1* 3/2014 Zhao ................... G06F 9/45558
709/226
2014/0173623 A1* 6/2014 Chang .................. G06F 9/5088
718/105
(Continued)

FOREIGN PATENT DOCUMENTS

| CN | 103218261 A | 7/2013 |
| CN | 104317658 A | 1/2015 |

(Continued)

OTHER PUBLICATIONS

International Search Report dated Oct. 24, 2017 in corresponding International Application No. PCT/CN2017/092809.
(Continued)

*Primary Examiner* — Jason D Recek
(74) *Attorney, Agent, or Firm* — Fish & Richardson P.C.

(57) ABSTRACT

Embodiments of the present invention disclose a resource load balancing control method and a cluster scheduler. The method includes: predicting performance data that is of an application deployed on each cluster node and that is in a preset time period; calculating a first standard deviation of the cluster system according to the predicted performance data of each cluster node; when the first standard deviation of the cluster system is greater than a preset threshold, determining an application migration solution according to a resource load balancing rule; and sending a application migration solution to the cluster application manager, to trigger the cluster application manager to perform resource load balancing control on the cluster system according to a application migration solution.

12 Claims, 5 Drawing Sheets

(56) References Cited

U.S. PATENT DOCUMENTS

2016/0078361 A1\* 3/2016 Brueckner ............ H04L 67/10
  706/12
2018/0097874 A1\* 4/2018 Sampathkumar ... H04L 41/0896

FOREIGN PATENT DOCUMENTS

| CN | 104834569 A | 8/2015 |
|---|---|---|
| CN | 105320559 A | 2/2016 |
| CN | 105607948 A | 5/2016 |
| EP | 2717158 A1 | 4/2014 |

OTHER PUBLICATIONS

PCT International Search Report and Written Opinion issued in International Application No. PCT/CN2017/092809 dated Oct. 24, 2017, 18 pages (with English translation).
Extended European Search Report issued in European Application No. 17866109.6 dated Jul. 30, 2019, 11 pages.
Hu et al., "Autoscaling prediction models for cloud resource provisioning," 2016 2nd IEEE International Conference on Computer and Communications, Oct. 14, 2016, XP033094694, pp. 1364-1369.
Minaroili, "Utility-based Allocation of Resources to Virtual Machines in Cloud Computing," PhD Dissertation, Philipps-Universität Marburg, Jan. 2014, XP055367391, 183 pages.
Niehörster et al., "Autonomic Resource Management with Support Vector Machines," 2011 IEEE/ACM 12th International Conference on Grid Computing, Sep. 2011, XP032021774, 8 pages.

\* cited by examiner

RESOURCE LOAD BALANCING CONTROL METHOD AND CLUSTER SCHEDULER

CROSS-REFERENCE TO RELATED APPLICATIONS

This application is a continuation of International Application No. PCT/CN2017/092809, filed on Jul. 13, 2017, which claims priority to Chinese Patent Application No. 201610933991.8, filed on Oct. 31, 2016. The disclosures of the aforementioned applications are hereby incorporated by reference in their entireties.

TECHNICAL FIELD

The present invention relates to the field of communications technologies, and in particular, to a resource load balancing control method and a cluster scheduler.

BACKGROUND

With development of virtualization and cloud computing, cloud centers are increasingly widely applied. A cloud center includes at least one cluster system, and each cluster system includes a cluster scheduler, a cluster application manager, and multiple cluster nodes. After the cluster scheduler receives an application deployment request, an application may be deployed onto different cluster nodes. To enable more balanced and appropriate use of resources (such as a computing resource, a storage resource, and a network resource), the cluster application manager needs to monitor a resource load status of each cluster node, so as to perform resource load balancing control on the cluster system.

Currently, resource load balancing control is performed on a cluster system in two manners. A first manner is performing determining according to historical data usage. For example, a VMware DRS (Distributed Resource Scheduler, distributed resource scheduler) evaluates a standard deviation (that is, a resource load balance degree) of a cluster system according to cluster node resource usage in a historical record, and performs a dynamic virtual machine migration when the standard deviation of the cluster system is greater than a specified threshold. A second manner is determining whether a virtual machine migration needs to be performed on a cluster node according to historical performance data of the cluster node with reference to predicted data of the cluster node. However, in the foregoing two manners, an invalid migration may occur in some cases in the first manner. For example, load of a cluster node is relatively high at a T1 moment but recovers to a proper level at a T1+1 moment. In this case, a virtual machine migration is not required. In the second manner, a cluster node is used as a carrier of a virtual machine, and virtual machine deployment on the cluster node is changing, and therefore load data of the cluster node is irregular. Consequently, prediction performed based on the load data of the cluster node is incorrect, and may result in an incorrect decision.

It can be learned that balancing control cannot be correctly performed on resource load of a cluster system in either of the foregoing two manners.

SUMMARY

Embodiments of the present invention provide a resource load balancing control method and a cluster scheduler, to improve migration validity, and in addition, to more accurately perform resource load balancing control on a cluster system.

A first aspect of the embodiments of the present invention discloses a resource load balancing control method. The method may be applied to a cluster scheduler included in a cluster system. The cluster system further includes a cluster application manager and multiple cluster nodes, and the cluster application manager is configured to manage applications deployed on the multiple cluster nodes. The method includes:

predicting performance data that is of an application deployed on each cluster node and that is in a preset time period, where the performance data is used to represent resource usage that is of a application deployed on the cluster node and that is in the preset time period; calculating a first standard deviation of the cluster system according to predicted performance data of each cluster node, where the first standard deviation is used to represent a resource load balance degree of the cluster system in the preset time period; and when the first standard deviation of the cluster system is greater than a preset threshold, determining an application migration solution according to a resource load balancing rule, so that current resource load of the cluster system is balanced or resource load of the cluster system in the preset time period is balanced after a application migration solution is executed.

In some implementations, the cluster scheduler sends a application migration solution to the cluster application manager, to trigger the cluster application manager to perform the resource load balancing control on the cluster system according to a application migration solution. In some other implementations, the cluster scheduler and the cluster application manager may also be located on a same physical device, or the foregoing method may also be applied to the cluster application manager.

A application migration solution is used to instruct to migrate a first application deployed on a first cluster node to a second cluster node, or a application migration solution is used to instruct to exchange a first application deployed on a first cluster node with a second application deployed on a second cluster node. Each of the first cluster node and the second cluster node is a cluster node in the multiple cluster nodes.

Multiple applications may be deployed on a cluster node, and each application may occupy different types of resources, such as a computing resource (such as a CPU and a memory), a storage resource (such as a magnetic disk), and a network resource (such as network bandwidth).

An application deployed on a cluster node is highly stable, and a application operates regularly. In addition, resources occupied by a application are also relatively highly regular. In an embodiment of the present invention, an application on a cluster node is used as an object and performance data of a application is predicted. This manner has stronger predictability, and a more accurate prediction result. The cluster scheduler determines, according to a prediction result, whether to perform a migration, so as to avoid an invalid migration and improve migration validity. In addition, after it is determined that an application needs to be migrated, the cluster scheduler formulates an application migration solution according to a resource load balancing rule, so as to more accurately perform the balancing control on the resource load of the cluster system.

In a possible implementation, the method further includes:

constructing training data for each cluster node by using historical performance data of a application deployed on the cluster node; and performing training by using the training data to obtain a data model; and the predicting performance data that is of an application deployed on each cluster node and that is in a preset time period includes: for each cluster node, determining multiple applications deployed on the cluster node; for each application, constructing historical performance data that is in a first quantity of periods and that is of a application that uses a current period as a reference, and using the historical performance data as input data; inputting the input data into the data model to predict performance data that is of a application and that is in the preset time period; and adding predicted performance data of all applications on the cluster node up to obtain the performance data that is of the cluster node and that is in the preset time period.

Model training may be offline training or online training, and only needs to be performed once. Each application of the cluster node has performance data of multiple resources in each period, and a machine learning model may be established for performance data of each resource, to predict data of the resource in a next period. Historical performance data of each resource may be considered as a time sequence $\{X_r(t), t=1, 2, \ldots T\}$, and performance data in a next period may be obtained by means of prediction by using previous k pieces of historical performance data.

In a possible implementation, the performing training by using the training data to obtain a data model includes:

performing training by using the training data according to a support vector machine SVM algorithm to obtain the data model; or performing training by using the training data according to a linear regression algorithm to obtain the data model.

Regression may be performed by using the support vector machine (support vector machine, SVM) algorithm, or optionally, prediction may be performed by using the linear regression (LinearRegression) algorithm.

In a possible implementation, the preset time period is in a unit of period; and when the preset time period is multiple periods, calculating resource load of the cluster node in the preset time period according to the predicted performance data of each cluster node includes:

for each cluster node, calculating resource load of the cluster node in each period according to the predicted performance data of the cluster node; obtaining an average resource load value by averaging multiple pieces of the resource load of the cluster node; and determining the average resource load value as the resource load of the cluster node in the multiple periods.

In a possible implementation, the determining an application migration solution according to a resource load balancing rule, so that current resource load of the cluster system is balanced or resource load of the cluster system in the preset time period is balanced after a application migration solution is executed includes:

determining, according to the resource load balancing rule, a application migration solution by using current performance data of a application deployed on each cluster node, so that the current resource load of the cluster system is balanced after a application migration solution is executed; or determining, according to the resource load balancing rule, a application migration solution by using performance data that is of a application deployed on each cluster node and that is in the preset time period, so that the resource load of the cluster system in the preset time period is balanced after a application migration solution is executed.

In this implementation, the current performance data of a application may be used to determine a application migration solution, so that the current resource load of the cluster system is balanced; or the performance data of a application in the preset time period may be used to determine a application migration solution, so that the resource load of the cluster system in the preset time period is balanced.

In a possible implementation, the determining a application migration solution includes:

selecting a cluster node with heaviest resource load from the multiple cluster nodes as a first cluster node; traversing applications on the first cluster node to select a first application, where a difference between resource load of the first cluster node after a migration of the first application is simulated and average resource load of the cluster system before the migration of the first application is simulated is minimum; traversing cluster nodes other than the first cluster node in the multiple cluster nodes to select a second cluster node, where after a migration of the first application to the second cluster node is simulated, a second standard deviation of the cluster system is minimum and the second standard deviation of the cluster system is less than the preset threshold; and generating an application migration solution instructing to migrate the first application deployed on the first cluster node to the second cluster node.

The resource load of the first cluster node, the average resource load of the cluster system, and the second standard deviation of the cluster system may be calculated by using the current performance data of a application or the performance data of a application in the preset time period. A application migration solution in this possible implementation may be referred to as a single-step migration solution, and may enable the cluster system to quickly achieve resource load balance.

In a possible implementation, the determining a application migration solution includes:

sorting all cluster nodes according to resource load of each cluster node; classifying the sorted cluster nodes into a heavy-load cluster node and a light-load cluster node; traversing an application deployed on the heavy-load cluster node and an application deployed on the light-load cluster node, so as to exchange an application deployed on the heavy-load cluster node with an application deployed on the light-load cluster node; determining a first application deployed on a first cluster node in the heavy-load cluster node and a second application deployed on a second cluster node in the light-load cluster node, where a difference between a third standard deviation of the cluster system before an application exchange and a fourth standard deviation of the cluster system after a application exchange is maximum, and the third standard deviation is greater than the fourth standard deviation; and generating an application migration solution instructing to exchange the first application deployed on the first cluster node with the second application deployed on the second cluster node.

The resource load of each cluster node, the third standard deviation of the cluster system, and the fourth standard deviation of the cluster system may be calculated by using the current performance data of a application or the performance data of a application in the preset time period. A application migration solution in this possible implementation may be referred to as an exchange migration solution, and may enable the cluster system to quickly achieve resource load balance. The foregoing single-step migration solution and the exchange migration solution may be complementary. For example, if a second cluster node into which an application is to be migrated cannot be found in the foregoing single-migration solution, the exchange migration solution may be used.

A second aspect of the embodiments of the present invention discloses a cluster scheduler, and the cluster scheduler includes a functional unit for performing some or all steps of any method in the first aspect of the embodiments of the present invention. When the cluster scheduler performs some or all steps of any method in the first aspect, migration validity can be improved, and in addition, balancing control can be more accurately performed on resource load of a cluster system.

A third aspect of the embodiments of the present invention discloses a resource scheduler. The resource scheduler includes a processor, a communications interface, and a memory. The memory is configured to store an instruction, the processor is configured to run the instruction, and the processor runs the instruction to perform some or all steps of any method in the first aspect of the embodiments of the present invention. When the resource scheduler performs some or all steps of any method in the first aspect, migration validity can be improved, and in addition, balancing control can be more accurately performed on resource load of a cluster system.

A fourth aspect of the embodiments of the present invention discloses a computer storage medium. The computer storage medium stores a program, and the program specifically includes an instruction that is used to perform some or all steps of any method in the first aspect of the embodiments of the present invention.

In some possible implementations, the method further includes:

when it is detected that a preset condition for performing resource scheduling is met, obtaining historical performance data that is of an application deployed on each cluster node and that is in a historical time period; calculating a fifth standard deviation of a cluster system according to historical performance data that is of all cluster nodes and that is in the historical time period; and when the fifth standard deviation is greater than a preset threshold, determining that historical resource load of the cluster system is imbalanced. Specifically, a manner of the calculating a fifth standard deviation of a cluster system according to historical performance data that is of all cluster nodes and that is in the historical time period may be: calculating historical resource load of the cluster node according to historical performance data that is of the cluster node and that is in the historical time period; averaging the historical resource load of all cluster nodes to obtain historical average resource load that is of the cluster system and that is in the historical time period; and calculating the fifth standard deviation of the cluster system according to the historical resource load of all cluster nodes and the historical average resource load of the cluster system, where the fifth standard deviation is used to represent a resource load balance degree of the cluster system in the historical time period. The preset condition for performing resource scheduling may include but is not limited to a timing event and a typical trigger event (such as newly adding a cluster, deleting a cluster, deploying an application, deleting an application, and the like). The cluster scheduler may trigger resource scheduling at an interval of a specific period, or may trigger resource scheduling when the foregoing typical trigger event is detected.

BRIEF DESCRIPTION OF DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

Figure 1:
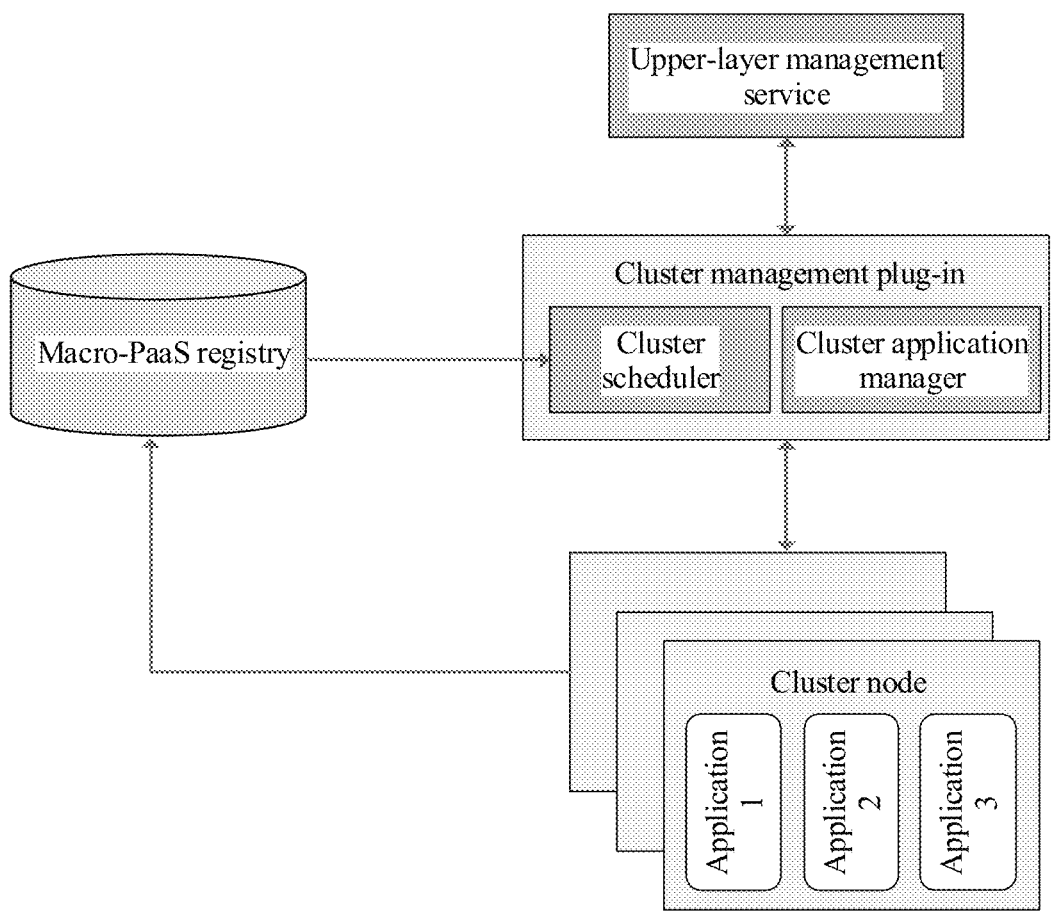
FIG. 1 is a schematic diagram of a network architecture of a cluster system according to an embodiment of the present invention.

The following clearly and completely describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

In the specification, claims, and accompanying drawings of the present invention, the terms "include", "contain" and any other variants mean to cover the non-exclusive inclusion. For example, a process, a method, a system, a product, or a device that includes a series of steps or units is not limited to the listed steps or units, but optionally further includes an unlisted step or unit, or optionally further includes another inherent step or unit of the process, the method, the product, or the device.

In the following, some terms in this application are described, so as to help a person skilled in the art have a better understanding.

(1) Standard deviation (Standard Deviation): A square root of an arithmetic average of a square of a difference between standard values of all individuals in a system and an average of the standard values. The standard deviation reflects a dispersion degree of all the individuals in the system. In probability statistics, the standard deviation is usually used for measuring statistical dispersion.

(2) Resource load balancing: In a specific resource environment, resource adjustment is performed between different resource users according to a specific resource use rule, so that use of a resource is more balanced and appropriate, thereby achieving resource load balance. The resource may include but is not limited to a computing resource (such as a CPU and a memory), a storage resource (such as a magnetic disk), and a network resource (such as network bandwidth). The standard deviation may be usually used to measure a resource load balance degree of the system. A critical value for representing resource load balance of the system (that is, a preset threshold) may be preset. If a calculated standard deviation of the system exceeds the preset threshold, it indicates that the dispersion degree of the individuals in the system is high. For example, if a physical resource A is far more frequently used than a physical resource B, in this case, it may be determined that resource load of the system is imbalanced. On the contrary, if the calculated standard deviation of the system does not exceed the preset threshold, it indicates that the dispersion degree of the individuals in the system is relatively low, and it may be determined that the resource load of the system is balanced.

(3) Balance of current resource load of a cluster system: Specifically, a current standard deviation of the cluster system is calculated based on current performance data of an application deployed on each cluster node in the cluster system. If the calculated current standard deviation of the cluster system is less than a preset threshold, it may be determined that the current resource load of the cluster system is balanced.

(4) Balance of resource load of a cluster system in a preset time period: Specifically, a standard deviation of the cluster system in the preset time period is calculated based on performance data that is of an application deployed on each cluster node in the cluster system and that is in the preset time period. If the calculated standard deviation of the cluster system in the preset time period is less than a preset threshold, it may be determined that the resource load of the cluster system in the preset time period is balanced. It should be noted that the "balance of resource load of a cluster system in a preset time period" described in the embodiments of the present invention is determined based on the performance data that is of a application deployed on each cluster node in the cluster system and that is in the preset time period.

The embodiments of the present invention disclose a resource load balancing control method and a cluster scheduler, to improve migration validity, and in addition, to more accurately perform resource load balancing control on a cluster system. Details are separately described below.

For a better understanding of the embodiments of the present invention, the following first describes a schematic diagram of a network architecture of a cluster system disclosed in the embodiments of the present invention.

Referring to FIG. 1, FIG. 1 is a schematic diagram of a network architecture of a cluster system according to an embodiment of the present invention. As shown in FIG. 1, the cluster system includes an upper-layer management service, a cluster management plug-in, multiple cluster nodes, and a Macro-PaaS registry. In the network architecture shown in FIG. 1, a management service at a platform as a service (Platform as a Service, PaaS) layer can implement resource scheduling and management on a cluster node.

The upper-layer management service may be the management service at the PaaS layer. Specifically, the upper-layer management service may be a progress or a thread, and the upper-layer management service is mainly used to deliver an application deployment request and a resource scheduling request to the cluster management plug-in.

The cluster management plug-in is integrated with the upper-layer management service, and mainly includes a cluster scheduler and a cluster application manager. The cluster scheduler and the cluster application manager may be two virtual application program modules. The cluster scheduler may receive an application deployment request sent by a management server, respond to a application deployment request, determine a location for deploying an application, that is, determine a cluster node in which an application is to be deployed, and may further monitor a resource load status of each cluster node and determine an application migration solution, so as to implement resource load balancing of the cluster system. The cluster application manager is responsible for application deployment and execution of a application migration solution.

A cluster node may be a Kubernetes cluster. Multiple applications (such as an application 1, an application 2, and an application 3) may be deployed on each cluster node. One Kubernetes cluster includes a group of resources provided by the PaaS layer, and the Kubernetes cluster further allocates the resources to an application deployed on the Kubernetes cluster. The resource may include but is not limited to a computing resource, a storage resource, and a network resource. Compared with infrastructure as a service (Infrastructure as a Service, IaaS), a Kubernetes cluster is equivalent to a physical machine that provides CPU, memory, storage, and network resources.

The Macro-PaaS registry is a registry-style data storage mechanism based on database implementation, and is mainly configured to store performance data of an application deployed on a cluster node. The performance data of a application is used to represent resource usage of a application, for example, 30 cores of a CPU are occupied, and 10 KB of a memory is occupied. The cluster node may collect the performance data of a application periodically by using collection components such as Kubernetes Heapster/cAdvisor, and save the performance data to the Macro-PaaS registry. The cluster scheduler may calculate and predict performance data that is of a application and that is in a next period based on historical performance data of a application.

In the network architecture shown in FIG. 1, the cluster scheduler may predict performance data that is of an application deployed on each cluster node and that is in a preset time period, and the performance data is used to represent resource usage that is of a application deployed on the cluster node and that is in the preset time period. Further, the cluster scheduler may calculate a first standard deviation of the cluster system according to predicted performance data of each cluster node. The first standard deviation is used to represent a resource load balance degree of the cluster system. When the first standard deviation of the cluster system is greater than a preset threshold, the cluster scheduler may further determine an application migration solution according to a resource load balancing rule, so that current resource load of the cluster system is balanced or resource load of the cluster system in the preset time period is balanced after a application migration solution is executed. Still further, the cluster scheduler may further send a application migration solution to the cluster application manager, to trigger the cluster application manager to perform balancing control on the resource load of the cluster system according to a application migration solution.

In the present invention, generally, an application deployed on a cluster node is highly stable and operates regularly, and resources occupied by a application are also regular. For example, according to a user use habit, an application is used for a relatively long time in a first phase (such as 10:00 to 12:00) but is used for a relatively short time in a second phase (such as 12:00 to 14:00). Correspondingly, resources occupied by a application in the first phase are more than resources occupied by a application in the second phase. In the network architecture shown in FIG. 1, an application on a cluster node is used as an object, and performance data of a application is predicted. This manner has stronger predictability, and a more accurate prediction result. The cluster scheduler determines, according to a prediction result, whether to perform a migration, so as to avoid an invalid migration and improve migration validity. In addition, after it is determined that an application needs to be migrated, the cluster scheduler formulates an application migration solution according to a resource load balancing rule, so as to more accurately perform the balancing control on the resource load of the cluster system.

It should be noted that the network architecture of the cluster system disclosed in FIG. 1 is not a limitation to the embodiments of the present invention, and the method described in the embodiments of the present invention may further be applied to another scenario related to load balancing, for example, virtual machine scheduling at an infrastructure as a service (Infrastructure as a Service, IaaS) layer and load balancing of a big data cluster.

Figure 2:
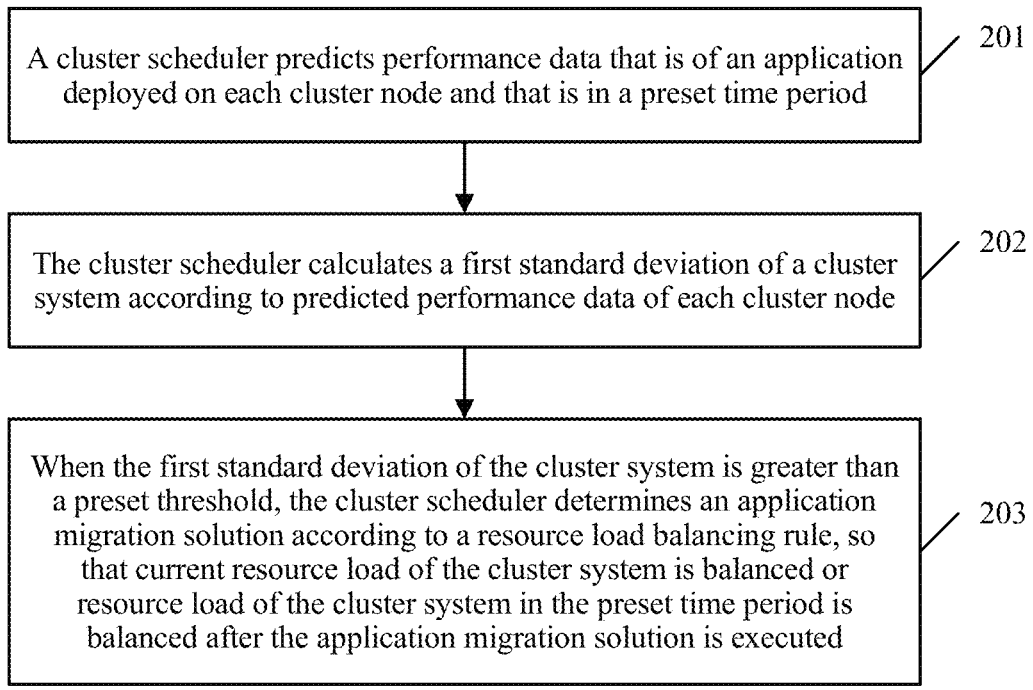
FIG. 2 is a schematic flowchart of a resource load balancing control method according to an embodiment of the present invention.

Referring to FIG. 2, FIG. 2 is a schematic flowchart of a resource load balancing control method according to an embodiment of the present invention. The method is applied to a cluster scheduler included in a cluster system. The cluster system further includes a cluster application manager and multiple cluster nodes. The cluster application manager is configured to manage applications deployed on multiple cluster nodes. As shown in FIG. 2, the method may include the following steps.

201. The cluster scheduler predicts performance data that is of an application deployed on each cluster node and that is in a preset time period.

The performance data is used to represent resource usage that is of a application deployed on the cluster node and that is in the preset time period. When historical resource load of the cluster system is imbalanced, the cluster scheduler may predict the performance data that is of a application deployed on each cluster node and that is in the preset time period. Alternatively, when historical resource load of the cluster system is balanced, the cluster scheduler may also predict the performance data that is of a application deployed on each cluster node and that is in the preset time period. The historical resource load is an average resource load in a time period prior to current time. The preset time period may be one period or multiple periods.

In an optional implementation, before step 201, the method may further include the following steps:

(11) when it is detected that a preset condition for performing resource scheduling is met, obtaining historical performance data that is of a application deployed on each cluster node and that is in a historical time period;

(12) calculating a fifth standard deviation of the cluster system according to historical performance data that is of all cluster nodes and that is in the historical time period; and

(13) when the fifth standard deviation is greater than a preset threshold, determining that the historical resource load of the cluster system is imbalanced.

In this optional implementation, the preset condition for performing resource scheduling may include but is not limited to a timing event and a typical trigger event (such as newly adding a cluster, deleting a cluster, deploying an application, deleting an application, and the like). The cluster scheduler may trigger resource scheduling at an interval of a specific period, or may trigger resource scheduling when the foregoing typical trigger event is detected.

When it is detected that the preset condition for performing resource scheduling is met, the cluster scheduler may obtain the historical performance data that is of a application deployed on each cluster node and that is in the historical time period. The historical time period may be a preset quantity of periods that are prior to a current period and that are set by a user. The historical performance data is used to represent resource usage that is of a application deployed on each cluster node and that is in the historical time period, for example, computing resource usage, storage resource usage, and network resource usage of an application 1, and computing resource usage, storage resource usage, and network resource usage of an application 2. The historical time period may be in a unit of period.

Specifically, for each cluster node, historical resource load of the cluster node may be calculated according to historical performance data that is of the cluster node and that is in the historical time period, and historical average resource load of the cluster system in the historical time period may be obtained by averaging historical resource load of all cluster nodes. Further, the fifth standard deviation of the cluster system may be calculated according to the historical resource load of each cluster node and the historical average resource load of the cluster system. The fifth standard deviation is used to represent a resource load balance degree of the cluster system in the historical time period, and when the fifth standard deviation is greater than the preset threshold, it may be determined that the historical resource load of the cluster system is imbalanced. The preset threshold may be set by the user, or may be set by the system by default, and this is not limited in this embodiment of the present invention.

A formula for calculating a standard deviation is as follows:

$$\sigma = \sqrt{\frac{1}{N}\sum_{i=1}^{N}(x_i - \mu)^2}$$

$x_1, x_2 \ldots x_N$ is resource load of a cluster node, and $\mu$ is average resource load of a cluster system.

In another optional implementation, the method further includes the following steps:

(21) constructing training data for each cluster node by using the historical performance data of a application deployed on the cluster node; and

(22) performing training by using the training data to obtain a data model.

Specifically, a manner in which the cluster scheduler predicts the performance data that is of a application deployed on each cluster node and that is in the preset time period may be specifically:

(31) for each cluster node, determining multiple applications deployed on the cluster node;

(32) for each application, constructing historical performance data of a application that uses a current period as a reference, and using the historical performance data as input data;

(33) inputting the input data into the data model to predict the performance data that is of a application and that is in the preset time period; and

(34) adding predicted performance data of all applications on the cluster node up to obtain the performance data that is of the cluster node and that is in the preset time period.

A manner of the foregoing step (22) may be specifically:

performing training by using the training data according to a support vector machine SVM algorithm to obtain the data model; or performing training by using the training data according to a linear regression algorithm to obtain the data model.

In this optional implementation, model training is independent offline training, and only needs to be performed once. Each application of the cluster node has performance data of multiple resources in each period, and a machine learning model may be established for performance data of each resource, to predict data of the resource in a next period. Historical performance data of each resource may be considered as a time sequence $\{X_r(t), t=1, 2 \ldots T\}$, and performance data in a next period may be obtained by means of prediction by using previous k pieces of historical performance data. A prediction model may be described in the following two forms:

A first prediction model may be described as follows:

$$X_r(t)=\varphi[X_r(t-1),X_r(t-2), \ldots ,X_r(t-k)] \quad (1)$$

In the formula (1), r is a resource type, such as a CPU, a memory, a magnetic disk, or network bandwidth, $\varphi$ is a non-linear function, and k is an embedding dimension.

According to the foregoing prediction model, an appropriate parameter k is selected according to a collection period of the historical performance data, and T–k data sets are constructed according to the historical performance data and are used as input data sets (that is, the training data) for the model training. k may be an empirical value or may be obtained by means of training.

Referring to Table 1 below, Table 1 lists a relationship that is based on the prediction model and that is between input data and output data.

TABLE 1

| Input data | Output data |
|---|---|
| $X_r(1), X_r(2), \ldots , X_r(k)$ | $X_r(k+1)$ |
| ... | ... |
| $X_r(t-k), \ldots , X_r(t-2), X_r(t-1)$ | $X_r(t)$ |
| ... | ... |
| $X_r(T-k), \ldots , X_r(T-2), X_r(T-1)$ | $X_r(T)$ |

For the first prediction model, the support vector machine (support vector machine, SVM) algorithm may be selected to perform regression, and a radial basis function RBF may be selected as a kernel function of the SVM. A sample may be planned in a non-linear manner into space of a higher dimension by using the RBF function, and a better effect is obtained when the RBF function is used to resolve a non-linear relationship problem between a label and an attribute. The SVM prediction model has three parameters in total: a parameter $\varepsilon$ of a non-sensitive loss function, a penalty parameter C, and a parameter $\gamma$ of the RBF kernel function. The input data sets may be classified into a training set and a testing set at a ratio of 3:1. There are various methods for selecting an SVM parameter, and a common method includes, for example, a grid search method, a bilinear method, and the like. A simplest permutation and combination is used below to select a parameter, and steps are as follows:

(a) Determine a value range and a step for each of to-be-trained parameters $\varepsilon$, $\gamma$, C.

(b) Progressively increase each parameter circularly in a unit of the step.

(c) Train the training set by using the parameters $\varepsilon$, $\gamma$, C to obtain a data model.

(d) Predict a prediction value of each piece of testing data by means of the data model by using data of the testing set as input data.

(e) Calculate an average absolute percentage error e, and a formula is as follows:

$$e = \frac{1}{n}\sum_{i=1}^{n}|X_i' - X_i|/X_i$$

$X_i'$ is a prediction value, $X_i$ is an actual value, and n is a testing set size.

Steps (a) to (e) are circularly performed until the parameter exceeds the value range. $\varepsilon$, $\gamma$, C with a minimum e value is selected as an optimal parameter combination, and the data model may be determined by inputting the optimal parameter combination into the foregoing preset model.

The second prediction model may be described as follows:

$$X_r(t)=\varphi[\theta_0+\theta_1 X_r(t-1)+\theta_2 X_r(t-2), \ldots ,\theta_k X_r(t-k)] \quad (2)$$

In the formula (2), $\varphi$ is a linear function, k is an embedding dimension, and r is a resource type, for example, a computing resource, a storage resource, or a network resource.

Similarly, according to the foregoing model, an appropriate parameter k may be selected according to a collection period of the historical performance data, and T–k data sets are constructed according to the historical data and are used as input data sets (that is, the training data) for the model training. For details, refer to the foregoing Table 1.

Different from the foregoing first prediction model, in the second prediction model, prediction may be performed by using the linear regression (LinearRegression) algorithm, and a linear regression model is relatively simple, and no parameter needs to be trained. The data model may be obtained by directly inputting a training set.

After the data model is determined, the cluster scheduler may determine, for each cluster node, multiple applications deployed on the cluster node. It is assumed that the current period is t, and historical performance data of each resource type $\{X_r(t-k), \ldots , X_r(t-1), X_r(t)\}$ may be constructed and used as input data for each application. Performance data $X_r(t+1)$ of the resource in the next period is predicted by using the foregoing obtained data model. Performance data of each resource of each cluster node in the next period may be calculated according to predicted performance data of each resource of each application, and a formula is as follows:

$$D_r = \sum_{i=1}^{p} X_r(t+1)_i \quad (3)$$

In the formula (3), p represents a quantity of applications in the cluster node, r is a resource type, and t is a current period.

202. The cluster scheduler calculates a first standard deviation of a cluster system according to predicted performance data of each cluster node.

Specifically, the resource load of the cluster node in the preset time period and the average resource load of the cluster system in the preset time period may be calculated according to the predicted performance data of each cluster node.

The first standard deviation of the cluster system is calculated according to resource load of each cluster node and the average resource load of the cluster system.

The resource load of the cluster node may be calculated by using the following formula:

$$x = \omega_1 \times (D_1/C) + \omega_2 \times (D_2/M) + \omega_3 \times (D_3/I) \qquad (4)$$

$D_1$, $D_2$, and $D_3$ are respectively various types of resources (such as a computing resource, a storage resource, and a network resource) occupied by a application; C, M, and I respectively represent total quantities of various resources; and $\omega_1$, $\omega_2$ represent weights, and $\omega_1 + \omega_2 = 1$. It should be noted that three types of resources are indicated in the foregoing formula (4) as an example. In addition, a person skilled in the art may understand that resource types more or less than those in formula (4) may be included.

Further, the foregoing resource load of all cluster nodes obtained by means of calculation may be averaged to obtain the average resource load of the cluster system. The first standard deviation of the cluster system may be calculated according to the resource load of each cluster node and the average resource load of the cluster system. The first standard deviation is used to represent a resource load balance degree of the cluster system in the preset time period.

203. When the first standard deviation of the cluster system is greater than a preset threshold, the cluster scheduler determines an application migration solution according to a resource load balancing rule, so that current resource load of the cluster system is balanced or resource load of the cluster system in the preset time period is balanced after a application migration solution is executed.

That the first standard deviation of the cluster system is greater than the preset threshold indicates that the resource load of the cluster system in the preset time period is imbalanced, and an application needs to be migrated, that is, an application migration solution needs to be determined.

In an optional implementation, a manner in which the cluster scheduler determines a application migration solution according to the resource load balancing rule, so that the current resource load of the cluster system is balanced or the resource load of the cluster system in the preset time period is balanced after a application migration solution is executed may be specifically:

determining, according to the resource load balancing rule, a application migration solution by using current performance data of a application deployed on each cluster node, so that the current resource load of the cluster system is balanced after a application migration solution is executed; or determining, according to the resource load balancing rule, a application migration solution by using performance data that is of a application deployed on each cluster node and that is in the preset time period, so that the resource load of the cluster system in the preset time period is balanced after a application migration solution is executed.

In this optional implementation, the current performance data of a application may be used to determine a application migration solution, so that the current resource load of the cluster system is balanced; or the performance data of a application in the preset time period may be used to determine a application migration solution, so that the resource load of the cluster system in the preset time period is balanced.

Regardless of using the current performance data of a application or the performance data of a application in the preset time period to determine a application migration solution, the cluster scheduler may determine a application migration solution in two implementations.

A first implementation specifically includes the following steps:

(41) selecting a cluster node with heaviest resource load from the multiple cluster nodes as a first cluster node;

(42) traversing applications on the first cluster node to select a first application, where a difference between resource load of the first cluster node after a migration of the first application is simulated and average resource load of the cluster system before the migration of the first application is simulated is minimum;

(43) traversing cluster nodes other than the first cluster node in the multiple cluster nodes to select a second cluster node, where after a migration of the first application to the second cluster node is simulated, a second standard deviation of the cluster system is minimum and the second standard deviation of the cluster system is less than the preset threshold; and

(44) generating an application migration solution instructing to migrate the first application deployed on the first cluster node to the second cluster node.

A application migration solution in the first implementation may be referred to as a single-step migration solution, and may enable the cluster system to quickly achieve resource load balance. The resource load of the first cluster node, the average resource load of the cluster system, and the second standard deviation of the cluster system may be calculated by using the current performance data of a application or the performance data of a application in the preset time period.

Figure 2A:
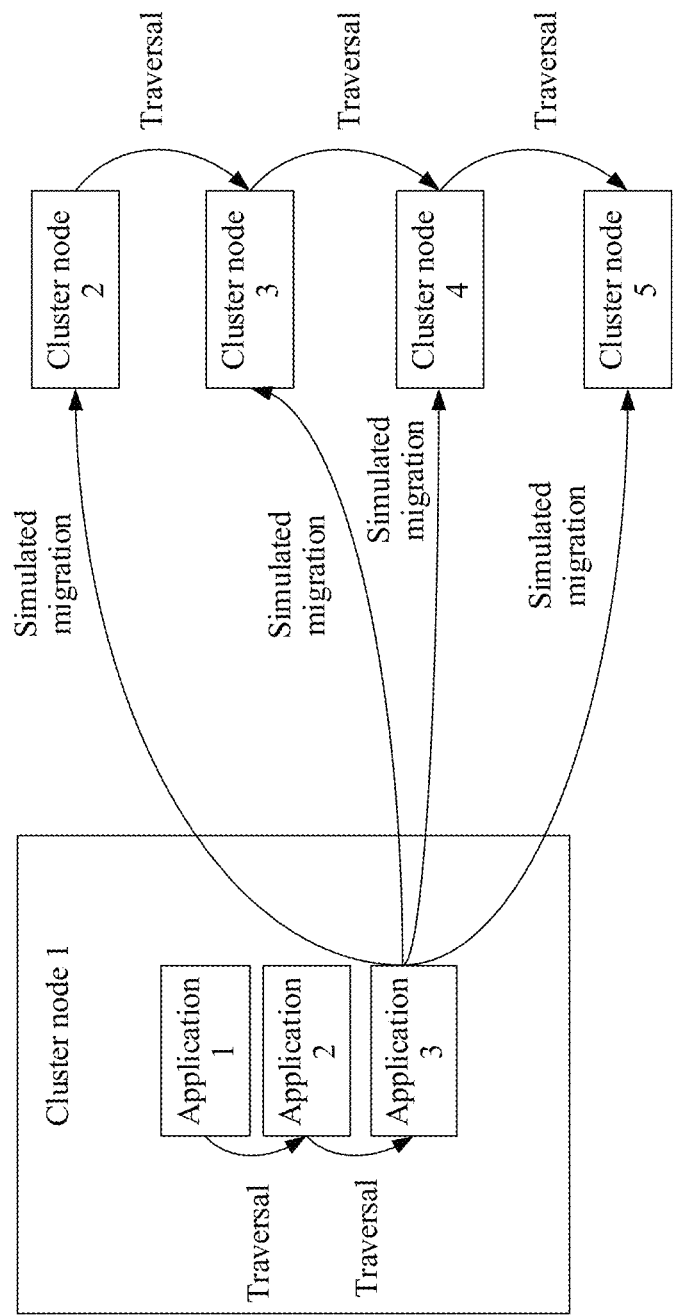
FIG. 2A is a schematic diagram of an application migration solution according to an embodiment of the present invention.

Referring to FIG. 2A, FIG. 2A is a schematic diagram of an application migration solution according to an embodiment of the present invention. As shown in FIG. 2A, a cluster system includes five cluster nodes (that is, a cluster node 1, a cluster node 2, a cluster node 3, a cluster node 4, and a cluster node 5). The cluster node 1 may be used as a cluster node with heaviest resource load, that is, a first cluster node, and the cluster node 2, the cluster node 3, the cluster node 4, and the cluster node 5 may be used as other cluster nodes in the five cluster nodes except the first cluster node.

In the first implementation, after the first cluster node is determined, applications (that is, an application 1, an application 2, and an application 3) deployed on the first cluster node may be determined as applications that can be migrated out. Further, a application 1, the application 2, and a application 3 may be traversed, and during each traversal, a difference between resource load of the first cluster node after a migration of a applications is simulated and average resource load of the cluster system before the migration of a applications is simulated may be calculated, and finally an application with a minimum difference may be selected as the first application (that is, an application that is to be migrated out). For example, it is assumed that the average resource load of the cluster system before the migration of a applications is simulated is 40%, the resource load of the first cluster node is deceased to 55% after a application 1 is migrated out, the resource load of the first cluster node is deceased to 50% after a application 2 is migrated out, and the resource load of the first cluster node is deceased to 45% after a application 3 is migrated out, the differences between the resource load of the first cluster node before the migration of a applications is simulated and the average resource load of the cluster system are respectively 15%, 10%, and 5%. Therefore, a application 3 may be determined as the first application.

After it is determined that the first application is a application 3, the cluster node 2, the cluster node 3, the cluster node 4, and the cluster node 5 may be traversed, and sequential migrations of a application 3 to the cluster node 2, the cluster node 3, the cluster node 4, and the cluster node 5 may be simulated. After each simulated migration, a second standard deviation of the cluster system may be calculated. After all cluster nodes are traversed, values of multiple second standard deviations obtained by means of calculation may be compared, so as to determine a minimum second standard deviation from the second standard deviations and determine a cluster node corresponding to the minimum second standard deviation as a second cluster node. Further, it may be determined whether the selected second standard deviation is less than a preset threshold. If the selected second standard deviation is less than the preset threshold, an application migration solution instructing to migrate the first application deployed on the first cluster node to the second cluster node may be generated. If the selected second standard deviation is not less than the preset threshold, it indicates that an optimal cluster node into which the first application is to be migrated is not found, and in this case, the first application may be deleted, and then the foregoing steps (42) to (44) may be repeatedly performed, until an application migration solution is determined or until there is no application left on a first cluster.

A second implementation specifically includes the following steps:

(51) sorting all cluster nodes according to resource load of each cluster node;

(52) classifying the sorted cluster nodes into a heavy-load cluster node and a light-load cluster node;

(53) traversing an application deployed on the heavy-load cluster node and an application deployed on the light-load cluster node, so as to exchange an application deployed on the heavy-load cluster node with an application deployed on the light-load cluster node;

(54) determining a first application deployed on a first cluster node in the heavy-load cluster node and a second application deployed on a second cluster node in the light-load cluster node, where a difference between a third standard deviation of the cluster system before an application exchange and a fourth standard deviation of the cluster system after a application exchange is maximum, and the third standard deviation is greater than the fourth standard deviation; and

(55) generating an application migration solution instructing to exchange the first application deployed on the first cluster node with the second application deployed on the second cluster node.

A application migration solution in the second implementation may be referred to as an exchange migration solution, and an application migration solution that enables the cluster system to achieve resource load balance may be quickly found. The foregoing single-step migration solution and the exchange migration solution may be complementary. For example, if a second cluster node into which an application is to be migrated cannot be found in the foregoing single-migration solution, the exchange migration solution may be used. The resource load of each cluster node, the third standard deviation of the cluster system, and the fourth standard deviation of the cluster system may be calculated by using the current performance data of a application or the performance data of a application in the preset time period.

Specifically, all the cluster nodes may be sorted in ascending order or descending order of resource load of all the cluster nodes. The sorted cluster nodes may be classified into the heavy-load cluster node and the light-load cluster node. Optionally, the sorted cluster nodes may be equally classified into the heavy-load cluster node and the light-load cluster node. Alternatively, optionally, a load threshold may be set, and a cluster node with resource load greater than the load threshold is determined as the heavy-load cluster node and a cluster node with resource load less than the load threshold is determined as the light-load cluster node. The heavy-load cluster node and the light-load cluster node each include multiple cluster nodes. Further, a application deployed on the heavy-load cluster node and a application deployed on the light-load cluster node may be traversed, so as to exchange a application deployed on the heavy-load cluster node with a application deployed on the light-load cluster node. During each traversal and exchange, third standard deviations of the cluster system before a applications are exchanged, fourth standard deviations of the cluster system after a applications are exchanged, and differences between the third standard deviations and the fourth standard deviations may be calculated, so as to select the first application deployed on the first cluster node in the heavy-load cluster node and the second application deployed on the second cluster node in the light-load cluster node, where a difference between a third standard deviation of the cluster system before a applications are exchanged and a fourth standard deviation of the cluster system after a applications are exchanged is maximum in all differences, and the third standard deviation is greater than the fourth standard deviation. Therefore, a application migration solution instructing to exchange the first application deployed on the first cluster node with the second application deployed on the second cluster node may be generated.

Figure 2B:
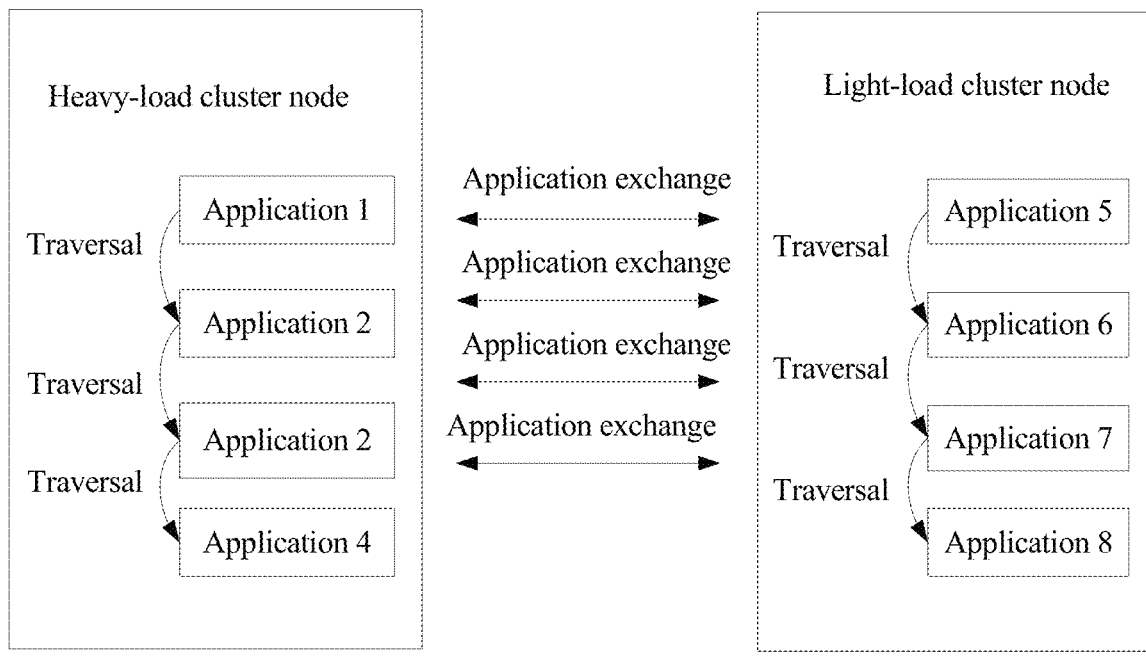
FIG. 2B is a schematic diagram of another application migration solution according to an embodiment of the present invention.

Referring to FIG. 2B, FIG. 2B is a schematic diagram of another application migration solution according to an embodiment of the present invention. The heavy-load cluster node includes multiple cluster nodes (not shown), and multiple applications (such as an application 1, and application 2, and application 3, and an application 4) are deployed on the heavy-load cluster node. The light-load cluster node includes multiple cluster nodes (not shown), and multiple applications (such as an application 5, an application 6, and application 7, and an application 8) are deployed on the light-load cluster node. A application deployed on the heavy-load cluster node and a application deployed on the light-load cluster node may be traversed, so as to exchange a application deployed on the heavy-load cluster node with a application deployed on the light-load cluster node. For example, a application 1 deployed on the heavy-load cluster node is sequentially exchanged with a application 5, a application 6, a application 7, and a application 8 deployed on the light-load cluster node; a application 2 deployed on the heavy-load cluster node is sequentially exchanged with a application 5, a application 6, a application 7, and a application 8 deployed on the light-load cluster node; a application 3 deployed on the heavy-load cluster node is sequentially exchanged with a application 5, a application 6, a application 7, and a application 8 deployed on the light-load cluster node; and a application 4 deployed on the heavy-load cluster node is sequentially exchanged with a application 5, a application 6, a application 7, and a application 8 deployed on the light-load cluster node. During each exchange, third standard deviations of the cluster system before a applications are exchanged, fourth standard deviations of the cluster system after a applications are exchanged, and differences between the third standard deviations and the fourth standard deviations may be calculated, so as to select the first application deployed on the first cluster node in the heavy-load cluster node and the second application deployed on the second cluster node in the light-load cluster node, where a difference between a third standard deviation of the cluster system before a applications are exchanged and a fourth standard deviation of the cluster system after a applications are exchanged is maximum in all differences, and the third standard deviation is greater than the fourth standard deviation.

It can be learned that an application migration solution that enables the cluster system to achieve resource load balance can be quickly found in both the foregoing two implementations. It should be noted that the foregoing two implementations may be complementary, that is, when the first implementation fails, the second implementation may be used.

In another optional implementation, the method may further include the following steps:

The cluster scheduler sends a application migration solution to the cluster application manager, to trigger the cluster application manager to perform resource load balancing control on the cluster system according to a application migration solution.

In this embodiment of the present invention, after a application migration solution is determined, the cluster scheduler may send a application migration solution to the cluster application manager. After receiving a application migration solution, the cluster application manager may perform the balancing control on the resource load of the cluster system according to a application migration solution.

It can be learned that in the method process described in FIG. 2, an application deployed on a cluster node is highly stable, and a application operates regularly. In addition, resources occupied by a application are also relatively highly regular. In this embodiment of the present invention, an application on a cluster node is used as an object and performance data of a application is predicted. This manner has stronger predictability, and a more accurate prediction result. The cluster scheduler determines, according to a prediction result, whether to perform a migration, so as to avoid an invalid migration and improve migration validity. In addition, after it is determined that an application needs to be migrated, the cluster scheduler formulates an application migration solution according to a resource load balancing rule, so as to more accurately perform the balancing control on the resource load of the cluster system.

Figure 3:
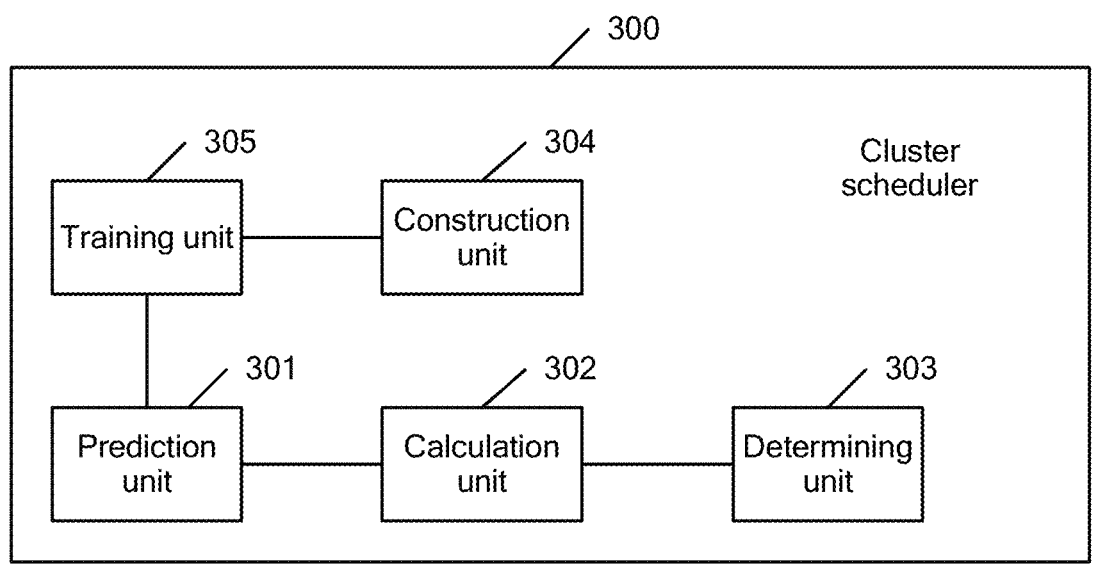
FIG. 3 is a schematic structural diagram of a cluster scheduler according to an embodiment of the present invention.

Referring to FIG. 3, FIG. 3 is a schematic structural diagram of a cluster scheduler according to an embodiment of the present invention. The cluster scheduler 300 is configured to perform some or all steps of the method described in FIG. 2. For details, refer to the description in FIG. 2, and details are not described herein. As shown in FIG. 3, the cluster scheduler 300 includes:

a prediction unit 301, configured to predict performance data that is of an application deployed on each cluster node and that is in a preset time period, where the performance data is used to represent resource usage that is of a application deployed on the cluster node and that is in the preset time period;

a calculation unit 302, configured to calculate a first standard deviation of the cluster system according to predicted performance data of each cluster node, where the first standard deviation is used to represent a resource load balance degree of the cluster system in the preset time period; and a determining unit 303, configured to: when the first standard deviation of the cluster system is greater than a preset threshold, determine an application migration solution according to a resource load balancing rule, so that current resource load of the cluster system is balanced or resource load of the cluster system in the preset time period is balanced after a application migration solution is executed.

A application migration solution is used to instruct to migrate a first application deployed on a first cluster node to a second cluster node, or a application migration solution is used to instruct to exchange a first application deployed on a first cluster node with a second application deployed on a second cluster node. Each of the first cluster node and the second cluster node is a cluster node in the multiple cluster nodes.

Optionally, a application migration solution may further be sent to the cluster application manager, to trigger the cluster application manager to perform resource load balancing control on the cluster system according to a application migration solution.

Optionally, the determining unit 303 is specifically configured to:

determine, according to the resource load balancing rule, a application migration solution by using current performance data of a application deployed on each cluster node, so that the current resource load of the cluster system is balanced after a application migration solution is executed; or determine, according to the resource load balancing rule, a application migration solution by using performance data that is of a application deployed on each cluster node and that is in the preset time period, so that the resource load of the cluster system in the preset time period is balanced after a application migration solution is executed.

Optionally, a manner in which the determining unit 303 determines a application migration solution is specifically:

selecting a cluster node with heaviest resource load from the multiple cluster nodes as a first cluster node;

traversing applications on the first cluster node to select a first application, where a difference between resource load of the first cluster node after a migration of the first application is simulated and average resource load of the cluster system before the migration of the first application is simulated is minimum;

traversing cluster nodes other than the first cluster node in the multiple cluster nodes to select a second cluster node, where after a migration of the first application to the second cluster node is simulated, a second standard deviation of the cluster system is minimum and the second standard deviation of the cluster system is less than the preset threshold; and generating an application migration solution instructing to migrate the first application deployed on the first cluster node to the second cluster node.

Optionally, a manner in which the determining unit 303 determines a application migration solution is specifically:

sorting all cluster nodes according to resource load of each cluster node;

classifying the sorted cluster nodes into a heavy-load cluster node and a light-load cluster node;

traversing an application deployed on the heavy-load cluster node and an application deployed on the light-load cluster node, so as to exchange an application deployed on the heavy-load cluster node with an application deployed on the light-load cluster node;

determining a first application deployed on a first cluster node in the heavy-load cluster node and a second application deployed on a second cluster node in the light-load cluster node, where a difference between a third standard deviation of the cluster system before an application exchange and a fourth standard deviation of the cluster system after a application exchange is maximum, and the third standard deviation is greater than the fourth standard deviation; and generating an application migration solution instructing to exchange the first application deployed on the first cluster node with the second application deployed on the second cluster node.

In an optional implementation, the cluster scheduler 300 shown in FIG. 3 may further include:

a construction unit 304, configured to construct training data for each cluster node by using historical performance data of a application deployed on the cluster node; and a training unit 305, configured to perform training by using the training data to obtain a data model.

The prediction unit 301 is specifically configured to:

for each cluster node, determine multiple applications deployed on the cluster node;

for each application, construct historical performance data that is in a first quantity of periods and that is of a application that uses a current period as a reference, and using the historical performance data as input data;

input the input data into the data model to predict performance data that is of a application and that is in the preset time period; and add predicted performance data of all applications on the cluster node up to obtain the performance data that is of the cluster node and that is in the preset time period.

A manner in which the training unit 305 performs training by using the training data to obtain the data model is specifically:

performing training by using the training data according to a support vector machine SVM algorithm to obtain the data model; or performing training by using the training data according to a linear regression algorithm to obtain the data model.

Optionally, the preset time period is in a unit of period, and when the preset time period is multiple periods, the calculation unit 302 is specifically configured to:

for each cluster node, calculate resource load of the cluster node in each period according to the predicted performance data of the cluster node;

obtain an average resource load value by averaging multiple pieces of the resource load of the cluster node; and determine the average resource load value as the resource load of the cluster node in the multiple periods.

In the cluster scheduler 300 described in FIG. 3, an application deployed on a cluster node is highly stable, and a application operates regularly. In addition, resources occupied by a application are also relatively highly regular. In this embodiment of the present invention, an application on a cluster node is used as an object and performance data of a application is predicted. This manner has stronger predictability, and a more accurate prediction result. The cluster scheduler determines, according to a prediction result, whether to perform a migration, so as to avoid an invalid migration and improve migration validity. In addition, after it is determined that an application needs to be migrated, the cluster scheduler formulates an application migration solution according to a resource load balancing rule, so as to more accurately perform the balancing control on the resource load of the cluster system.

It should be noted that the units described in FIG. 3 may be integrated into one progress or one thread. In addition, in an implementation, in the units described in FIG. 3, the prediction unit 301, the calculation unit 302, the determining unit 303, the construction unit 304, and the training unit 305 may be implemented by using a processor 401 in FIG. 4.

Figure 4:
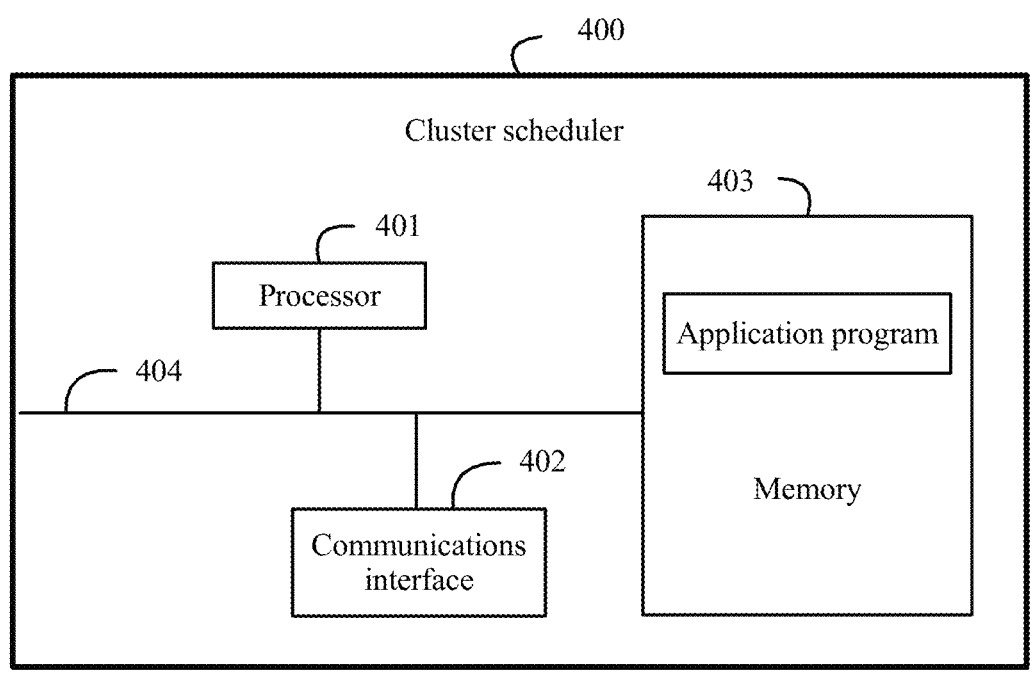
FIG. 4 is a schematic structural diagram of another cluster scheduler according to an embodiment of the present invention.

Referring to FIG. 4, FIG. 4 is a schematic structural diagram of another cluster scheduler according to an embodiment of the present invention. The cluster scheduler 400 is configured to perform some or all steps of the method described in FIG. 2. For details, refer to the description in FIG. 2, and details are not described herein. As shown in FIG. 4, the cluster scheduler 400 may include components such as at least one processor 401 such as a CPU, at least one communications interface 402, and a memory 403. These components may communicate and be connected by using one or more communications buses 404. A person skilled in the art may understand that a structure of the cluster scheduler 400 shown in FIG. 4 does not constitute a limitation on this embodiment of the present invention. The structure may not only be a bus structure, but may also be a star structure, and may further include more or fewer components than those shown in the figure, or combine some parts, or have different part arrangements.

In this embodiment of the present invention, the memory 403 may be a high-speed RAM memory or a non-volatile memory (non-volatile memory), such as at least one magnetic disk storage. Optionally, the memory 403 may also be at least one storage apparatus located far away from the processor 401.

In the cluster scheduler 400 shown in FIG. 4, the processor 401 may be configured to invoke an application program stored in the memory 403 to perform the following operations:

predicting performance data that is of an application deployed on each cluster node and that is in a preset time period, where the performance data is used to represent resource usage that is of a application deployed on the cluster node and that is in the preset time period;

calculating a first standard deviation of the cluster system according to predicted performance data of each cluster node, where the first standard deviation is used to represent a resource load balance degree of the cluster system in the preset time period; and when the first standard deviation of the cluster system is greater than a preset threshold, determining an application migration solution according to a resource load balancing rule, so that current resource load of the cluster system is balanced or resource load of the cluster system in the preset time period is balanced after a application migration solution is executed.

A application migration solution is used to instruct to migrate a first application deployed on a first cluster node to a second cluster node, or a application migration solution is used to instruct to exchange a first application deployed on a first cluster node with a second application deployed on a second cluster node. Each of the first cluster node and the second cluster node is a cluster node in the multiple cluster nodes.

Optionally, the processor 401 may further be configured to invoke a application program stored in the memory 403 to perform the following operation:

sending a application migration solution to the cluster application manager by using the communications interface 402, to trigger the cluster application manager to perform resource load balancing control on the cluster system according to a application migration solution.

Optionally, the processor 401 may further be configured to invoke a application program stored in the memory 403 to perform the following operations:

constructing training data for each cluster node by using historical performance data of a application deployed on the cluster node; and performing training by using the training data to obtain a data model.

The predicting, by the processor 401, performance data that is of an application deployed on each cluster node and that is in a preset time period includes:

for each cluster node, determining multiple applications deployed on the cluster node;

for each application, constructing historical performance data that is in a first quantity of periods and that is of a application that uses a current period as a reference, and using the historical performance data as input data;

inputting the input data into the data model to predict performance data that is of a application and that is in the preset time period; and adding predicted performance data of all applications on the cluster node up to obtain the performance data that is of the cluster node and that is in the preset time period.

A manner in which the processor 401 performs training by using the training data to obtain the data model is specifically:

performing training by using the training data according to a support vector machine SVM algorithm to obtain the data model; or performing training by using the training data according to a linear regression algorithm to obtain the data model.

Optionally, when the preset time period is multiple periods, calculating, by the processor 401, resource load of the cluster node in the preset time period according to the predicted performance data of each cluster node includes:

for each cluster node, calculating resource load of the cluster node in each period according to the predicted performance data of the cluster node;

obtaining an average resource load value by averaging multiple pieces of the resource load of the cluster node; and determining the average resource load value as the resource load of the cluster node in the multiple periods.

Optionally, the determining, by the processor 401, an application migration solution according to a resource load balancing rule, so that current resource load of the cluster system is balanced or resource load of the cluster system in the preset time period is balanced after a application migration solution is executed includes:

determining, according to the resource load balancing rule, a application migration solution by using current performance data of a application deployed on each cluster node, so that the current resource load of the cluster system is balanced after a application migration solution is executed; or determining, according to the resource load balancing rule, a application migration solution by using performance data that is of a application deployed on each cluster node and that is in the preset time period, so that the resource load of the cluster system in the preset time period is balanced after a application migration solution is executed.

Optionally, the determining a application migration solution by the processor 401 includes:

selecting a cluster node with heaviest resource load from the multiple cluster nodes as a first cluster node;

traversing applications on the first cluster node to select a first application, where a difference between resource load of the first cluster node after a migration of the first application is simulated and average resource load of the cluster system before the migration of the first application is simulated is minimum;

traversing cluster nodes other than the first cluster node in the multiple cluster nodes to select a second cluster node, where after a migration of the first application to the second cluster node is simulated, a second standard deviation of the cluster system is minimum and the second standard deviation of the cluster system is less than the preset threshold; and generating an application migration solution instructing to migrate the first application deployed on the first cluster node to the second cluster node.

Optionally, the determining a application migration solution by the processor 401 includes:

sorting all cluster nodes according to resource load of each cluster node;

classifying the sorted cluster nodes into a heavy-load cluster node and a light-load cluster node;

traversing an application deployed on the heavy-load cluster node and an application deployed on the light-load cluster node, so as to exchange an application deployed on the heavy-load cluster node with an application deployed on the light-load cluster node;

determining a first application deployed on a first cluster node in the heavy-load cluster node and a second application deployed on a second cluster node in the light-load cluster node, where a difference between a third standard deviation of the cluster system before an application exchange and a fourth standard deviation of the cluster system after a application exchange is maximum, and the third standard deviation is greater than the fourth standard deviation; and generating an application migration solution instructing to exchange the first application deployed on the first cluster node with the second application deployed on the second cluster node.

In the cluster scheduler 400 described in FIG. 4, an application deployed on a cluster node is highly stable, and a application operates regularly. In addition, resources occupied by a application are also relatively highly regular. In this embodiment of the present invention, an application on a cluster node is used as an object and performance data of a application is predicted. This manner has stronger predictability, and a more accurate prediction result. The cluster scheduler determines, according to a prediction result, whether to perform a migration, so as to avoid an invalid migration and improve migration validity. In addition, after it is determined that an application needs to be migrated, the cluster scheduler formulates an application migration solution according to a resource load balancing rule, so as to more accurately perform the balancing control on the resource load of the cluster system.

It should be noted that, to make the description brief, the foregoing method embodiments are expressed as a series of actions. However, a person skilled in the art should appreciate that the present invention is not limited to the described action sequence, because according to the present invention, some steps may be performed in other sequences or performed simultaneously. In addition, a person skilled in the art should also appreciate that all the embodiments described in the specification are example embodiments, and the related actions and modules are not necessarily mandatory to the present invention.

In the foregoing embodiments, the description of each embodiment has respective focuses. For a part that is not described in detail in an embodiment, reference may be made to related descriptions in other embodiments.

In the several embodiments provided in this application, it should be understood that the disclosed apparatus may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage. Based on such an understanding, the technical solutions of the present invention essentially, or the part contributing to the prior art, or all or a part of the technical solutions may be implemented in the form of a software product. The software product is stored in a storage and includes several instructions for instructing a computer device (which may be a personal computer, a server, or a network device) to perform all or a part of the steps of the methods described in the embodiments of the present invention. The foregoing storage includes: any medium that can store program code, such as a USB flash drive, a read-only memory (ROM, Read-Only Memory), a random access memory (RAM, Random Access Memory), a removable hard disk, a magnetic disk, or an optical disc.

A person of ordinary skill in the art may understand that all or some of the steps of the methods in the embodiments may be implemented by a program instructing relevant hardware. The program may be stored in a computer readable storage. The storage may include a flash memory, a read-only memory (English: Read-Only Memory, ROM for short), a random access memory (English: Random Access Memory, RAM for short), a magnetic disk, and an optical disc.

The embodiments of the present invention are described in detail above. The principle and implementation of the present invention are described herein through specific examples. The description about the embodiments of the present invention is merely provided to help understand the method and core ideas of the present invention. In addition, a person of ordinary skill in the art can make variations and modifications to the present invention in terms of the specific implementations and application scopes according to the ideas of the present invention. Therefore, the content of specification shall not be construed as a limit to the present invention.

What is claimed is:

1. A resource load balancing control method, comprising:
predicting performance data that is of an application deployed on each cluster node and that is in a preset time period, wherein the performance data represents resource usage that is of an application deployed on each cluster node and that is in the preset time period;
calculating a first standard deviation of a cluster system according to the predicted performance data of each cluster node, wherein the first standard deviation represents a resource load balance degree of the cluster system in the preset time period; and
in response to determining that the first standard deviation of the cluster system is greater than a preset threshold, determining an application migration solution according to a resource load balancing rule to balance a current resource load of the cluster system or a resource load of the cluster system in the preset time period after a application migration solution is executed, wherein determining the application migration solution comprises:
sorting all cluster nodes according to a resource load of each cluster node;
classifying the sorted cluster nodes into either a heavy-load cluster node or a light-load cluster node;
traversing an application deployed on the heavy-load cluster node and an application deployed on the light-load cluster node, so as to exchange an application deployed on the heavy-load cluster node with an application deployed on the light-load cluster node;
determining a first application deployed on a first cluster node in the heavy-load cluster node and a second application deployed on a second cluster node in the light-load cluster node by maximizing a difference between a third standard deviation of the cluster system before an application exchange and a fourth standard deviation of the cluster system after the application exchange, wherein the third standard deviation is greater than the fourth standard deviation; and
generating an application migration solution instructing to exchange the first application deployed on the first cluster node with the second application deployed on the second cluster node.

2. The method according to claim 1, wherein the method further comprises:
constructing training data for each cluster node by using historical performance data of an application deployed on the cluster node;
performing training by using the training data to obtain a data model; and
predicting the performance data that is of an application deployed on each cluster node and that is in a preset time period comprises:
for each cluster node, determining multiple applications deployed on the cluster node;
for each application, constructing historical performance data of a application that uses a current period as a reference, and using the historical performance data as input data;
inputting the input data into the data model to predict performance data that is of a application and that is in the preset time period; and adding predicted performance data of all applications on the cluster node up to obtain the performance data that is of the cluster node and that is in the preset time period.

3. The method according to claim 2, wherein performing training by using the training data to obtain the data model comprises:

performing training by using the training data according to a support vector machine (SVM) algorithm to obtain the data model; or performing training by using the training data according to a linear regression algorithm to obtain the data model.

4. The method according to claim 1, wherein the preset time period is in a unit of period; and when the preset time period is multiple periods, calculating the first standard deviation representing the resource load balance degree of the cluster system in the preset time period according to the predicted performance data of each cluster node comprises:

for each cluster node, calculating a resource load of the cluster node in each period according to the predicted performance data of the cluster node;

obtaining an average resource load value by averaging the calculated resource loads of the cluster node; and determining the average resource load value as the resource load of the cluster node in the multiple periods.

5. The method according to claim 1, wherein determining the application migration solution according to the resource load balancing rule comprises:

determining, according to the resource load balancing rule, the application migration solution by using current performance data of the application deployed on each cluster node, so that the current resource load of the cluster system is balanced after the application migration solution is executed; or determining, according to the resource load balancing rule, the application migration solution by using performance data that is of the application deployed on each cluster node and that is in the preset time period, so that the resource load of the cluster system in the preset time period is balanced after the application migration solution is executed.

6. The method according to claim 5, wherein the determining the application migration solution comprises:

selecting a cluster node with heaviest resource load from among multiple cluster nodes as a first cluster node;

traversing applications on the first cluster node to select a first application, wherein a difference between resource load of the first cluster node after a migration of the first application is simulated and average resource load of the cluster system before the migration of the first application is simulated is minimum;

traversing cluster nodes other than the first cluster node in the multiple cluster nodes to select a second cluster node, wherein after a migration of the first application to the second cluster node is simulated, a second standard deviation of the cluster system is minimum and the second standard deviation of the cluster system is less than the preset threshold; and generating an application migration solution instructing to migrate the first application deployed on the first cluster node to the second cluster node.

7. A cluster scheduler, comprising at least one processor, at least one memory, and a communications interface, wherein:

the at least one memory is configured to store computer executable instructions; and the at least one processor is connected to the at least one memory by using the communications interface, wherein the computer executable instructions instruct the at least one processor to perform one or more operations comprising:

predicting performance data that is of an application deployed on each cluster node and that is in a preset time period, wherein the performance data represents resource usage that is of an application deployed on each cluster node and that is in the preset time period;

calculating a first standard deviation of the cluster system according to the predicted performance data of each cluster node, wherein the first standard deviation represents a resource load balance degree of the cluster system in the preset time period; and in response to determining that the first standard deviation of the cluster system is greater than a preset threshold, determining an application migration solution according to a resource load balancing rule to balance a current resource load of the cluster system or a resource load of the cluster system in the preset time period after a application migration solution is executed, wherein determining the application migration solution comprises:

sorting all cluster nodes according to a resource load of each cluster node;

classifying the sorted cluster nodes into either a heavy-load cluster node or a light-load cluster node;

traversing an application deployed on the heavy-load cluster node and an application deployed on the light-load cluster node, so as to exchange an application deployed on the heavy-load cluster node with an application deployed on the light-load cluster node:

determining a first application deployed on a first cluster node in the heavy-load cluster node and a second application deployed on a second cluster node in the light-load cluster node by maximizing a difference between a third standard deviation of the cluster system before an application exchange and a fourth standard deviation of the cluster system after the application exchange, wherein the third standard deviation is greater than the fourth standard deviation; and generating an application migration solution instructing to exchange the first application deployed on the first cluster node with the second application deployed on the second cluster node.

8. The cluster scheduler according to claim 7, wherein the computer executable instructions instruct the at least one processor to perform one or more operations comprising:

constructing training data for each cluster node by using historical performance data of an application deployed on the cluster node;

performing training by using the training data to obtain a data model; and predicting the performance data that is of an application deployed on each cluster node and that is in a preset time period comprises:
  for each cluster node, determining multiple applications deployed on the cluster node;
  for each application, constructing historical performance data of a application that uses a current period as a reference, and using the historical performance data as input data;
  inputting the input data into the data model to predict performance data that is of a application and that is in the preset time period; and
  adding predicted performance data of all applications on the cluster node up to obtain the performance data that is of the cluster node and that is in the preset time period.

9. The cluster scheduler according to claim 8, performing training by using the training data to obtain the data model comprises:
  performing training by using the training data according to a support vector machine (SVM) algorithm to obtain the data model; or
  performing training by using the training data according to a linear regression algorithm to obtain the data model.

10. The cluster scheduler according to claim 7, wherein the preset time period is in a unit of period, and when the preset time period is multiple periods, the computer executable instructions instruct the at least one processor to perform one or more operations comprising:
  for each cluster node, calculating a resource load of the cluster node in each period according to the predicted performance data of the cluster node;
  obtaining an average resource load value by averaging the calculated resource loads of the cluster node; and
  determining the average resource load value as the resource load of the cluster node in the multiple periods.

11. The cluster scheduler according to claim 7, the computer executable instructions instruct the at least one processor to perform one or more operations comprising:
  determining, according to the resource load balancing rule, the application migration solution by using current performance data of the application deployed on each cluster node, so that the current resource load of the cluster system is balanced after the application migration solution is executed; or
  determining, according to the resource load balancing rule, the application migration solution by using performance data that is of the application deployed on each cluster node and that is in the preset time period, so that the resource load of the cluster system in the preset time period is balanced after the application migration solution is executed.

12. The cluster scheduler according to claim 11, determining the application migration solution comprises:
  selecting a cluster node with heaviest resource load from among multiple cluster nodes as a first cluster node;
  traversing applications on the first cluster node to select a first application, wherein a difference between resource load of the first cluster node after a migration of the first application is simulated and average resource load of the cluster system before the migration of the first application is simulated is minimum;
  traversing cluster nodes other than the first cluster node in the multiple cluster nodes to select a second cluster node, wherein after a migration of the first application to the second cluster node is simulated, a second standard deviation of the cluster system is minimum and the second standard deviation of the cluster system is less than the preset threshold; and
  generating an application migration solution instructing to migrate the first application deployed on the first cluster node to the second cluster node.

\* \* \* \* \*

UNITED STATES PATENT AND TRADEMARK OFFICE
CERTIFICATE OF CORRECTION

PATENT NO. : 10,924,535 B2
APPLICATION NO. : 16/397674
DATED : February 16, 2021
INVENTOR(S) : Shubao Du and Xibo Jin It is certified that error appears in the above-identified patent and that said Letters Patent is hereby corrected as shown below:

In the Claims

In Column 26, Line 44, in Claim 7, delete "node:" and insert -- node; --, therefor.

Signed and Sealed this
Eleventh Day of May, 2021

Drew Hirshfeld
*Performing the Functions and Duties of the*
*Under Secretary of Commerce for Intellectual Property and*
*Director of the United States Patent and Trademark Office*